United States Patent [19]
Burns

[11] Patent Number: 5,953,110
[45] Date of Patent: Sep. 14, 1999

[54] MULTICHANNEL LASER RADAR

[75] Inventor: Hoyt N. Burns, Orlando, Fla.

[73] Assignee: H.N. Burns Engineering Corporation, Orlando, Fla.

[21] Appl. No.: 09/064,892

[22] Filed: Apr. 23, 1998

[51] Int. Cl.$^6$ ............... G01C 3/08; G02B 6/38; G02B 6/06

[52] U.S. Cl. ............ 356/5.01; 356/5.04; 385/72; 385/116

[58] Field of Search ............ 385/116, 72; 356/5.01, 356/5.04

[56] References Cited

U.S. PATENT DOCUMENTS

| | | | |
|---|---|---|---|
| 3,830,568 | 8/1974 | Allen | 356/28 |
| 5,056,914 | 10/1991 | Kollodge . | |
| 5,210,586 | 5/1993 | Grage et al. . | |
| 5,243,553 | 9/1993 | Flockencier . | |
| 5,694,203 | 12/1997 | Ogawa | 356/5.04 |

Primary Examiner—Stephen C. Buczinski

Attorney, Agent, or Firm—William M. Hobby, III

[57] ABSTRACT

A multichannel laser radar has a laser array transmitter for generating a multiple laser beam array and a multichannel laser beam receiver for receiving reflected multiple laser beam array signals transmitted by said laser array transmitter. The multichannel laser beam receiver has a plurality of optical fibers coupled to a plurality of multichannel optical receiver photonic hybrid circuit boards for receiving reflected signals and processing the received signal range information and forming an image therefrom. Each circuit board has at least one detector assembly mounted thereon and each detector assembly has a plurality of photodetectors mounted to receive one end of each optical fiber so that a multichannel laser radar generates and receives multiple laser beams and parallel processes the received multiple laser beams to generate an image therefrom. Each detector on the detector assembly is mounted in a microcage having an opening therein for mounting the one end of one optical fiber and each optical fiber has a ceramic ferrule mounted on the end thereof shaped to fit into an opening in the microcage to allow the rapid attachment and alignment of the optical fiber ends relative to the photodetector.

9 Claims, 2 Drawing Sheets

MULTICHANNEL LASER RADAR

BACKGROUND OF THE INVENTION

The present invention relates to a multichannel laser radar and especially to an infrared imaging laser radar system for producing a 3-D image using a laser beam array transmitter and receiver.

An active near infrared imaging laser radar system of the type of the present invention provides capabilities for target tracking, guidance, and fire control systems by generating a high frame rate, high resolution, 3-D imagery in a compact, low power package. The system uses integrated photonic technologies and hybrid manufacturing processes to miniaturize a parallel multichannel optical receiver and range counter circuit. It also utilizes a modular high speed parallel multichannel optical receiver which includes receiving and range circuitry. The present parallel multichannel system is capable of performing a 3-D snapshot image with a single laser pulse not requiring scanning, even though a scanner is used in the basic system.

In recent years, significant advances have been made in the development of imaging laser radar systems for use as seekers in air-to-air and air-to-surface systems and the like. These include single channel raster-scanned diode laser rangefinders which generate high resolution target images. A single channel system can be raster-scanned to produce false color range images and gray scale intensity images of the objects being imaged. However, several minutes are required to collect each image and the system is not easily portable. The single channel system laser has a target recognition and classification algorithm added thereto.

More recently, work has begun on a compact multichannel system which can be carried aboard a remotely piloted vehicle and can generate and process laser radar imaging in real time. A multichannel receiver uses multiple avalanche photodetectors with individual transimpedance amplifiers, range counters, and reflectance circuits for each of the avalanche photodetector elements. The transmitter can use multiple laser diode arrays along with a high speed lens to produce a vertical fan of a plurality of individual laser beams spaced a small distance apart. The transmitter and receiver are aligned so that individual beams illuminate one corresponding avalanche photodetector element in the focal plane of the receiver lens to generate one multiple pixel column of the image. The transmitter and receiver scan horizontally with a rotating prism or mirror such that an image is formed which is 4° in elevation by 10° in azimuth. The frame rate is 30 Hz against cluttered arrays of ground targets, the multichannel system has obtained a high success rate and demonstrated the potential of an active infrared imaging laser radar system for short range autonomous guidance systems.

The present invention is a further development of a multichannel imaging laser radar system which utilizes parallel multichannel receivers including a plurality of multichannel optical receiver photonic hybrids or MORPHS, which are conveniently plugged into a compact motherboard and are connected with the received laser array through a plurality of optical waveguides to the plurality of MORPHS.

Active imaging laser radars form 3-dimensional images which can be processed to provide target identification and precision aimpoint definition in real time. Earlier raster-scanned and pushbroom-scanned 3-D imaging laser radar receivers required multiple laser pulses to assemble a complete 3-D image frame. Platform/target motion and atmospheric effects caused tearing and jitter in the assembled 3-D images, which complicated the subsequent image processing and necessitated the use of stabilized scanning systems. This invention deals with a parallel/multichannel imaging laser radar receiver (PMR) and uses an array of multichannel laser radar receivers to form single-pulse, 3-D laser radar images, thus eliminating the complex and costly scanning system, and enabling much higher frame rates (1 kHz). The PMR uses a multichannel optical receiver photonic hybrid (MORPH), a high performance 16-channel laser radar receiver module which uses an array of InGaAs avalanche photodiodes (APDs) for eyesafe operation (silicon APDs and PIN diode detectors are also supported). The MORPH provides high downrange resolution (3 inches), multihit (8 per channel) range data for each detector on a compact (less than 3×5 inches) circuit card. Optical flux is transferred from the receiver focal plane to each MORPH via a fiber optic ribbon cable. An array of MORPHs are plugged into a compact passive backplane, along with a single digital control card (DCC). The DCC, which is the same form factor as the MORPH, synchronizes the MORPHs and transfers the digital range information to the host processor over a parallel data interface cable. The system described here illustrates one approach to integrating and packaging high-density photonic arrays and their associated signal processing electronics to yield a compact, low power, scannerless, high performance imaging laser radar receiver, using existing technology.

SUMMARY OF THE INVENTION

A multichannel laser radar has a laser array transmitter for generating a multiple laser beam array and a multichannel laser beam receiver for receiving reflected multiple laser beam array signals transmitted by said laser array transmitter. The multichannel laser beam receiver has a plurality of optical fibers coupled to a plurality of multichannel optical receiver photonic hybrid circuit boards for receiving reflected signals and processing the received signal range information and forming an image therefrom. Each circuit board has at least one detector assembly mounted thereon and each detector assembly has a plurality of photodetectors mounted to receive one end of each optical fiber so that a multichannel laser radar generates and receives multiple laser beams and parallel processes the received multiple laser beams to generate an image therefrom. Each detector on the detector assembly is mounted in a microcage having an opening therein for mounting the one end of one optical fiber and each optical fiber has a ceramic ferrule mounted on the end thereof shaped to fit into an opening in the microcage to allow the rapid attachment and alignment of the optical fiber ends relative to the photodetector.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
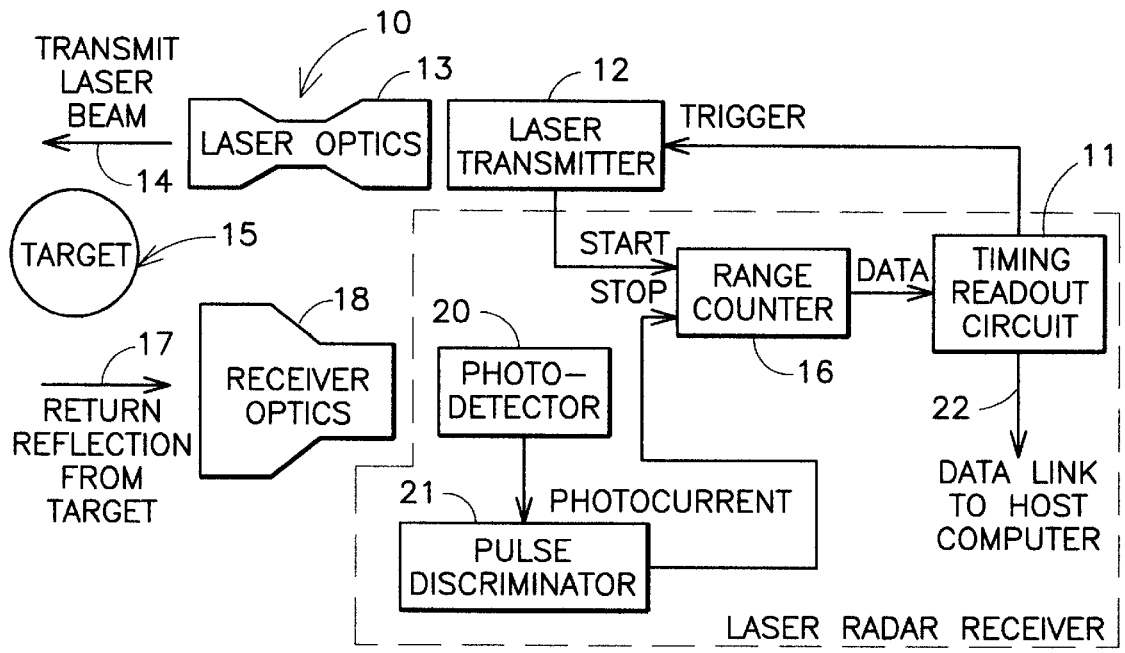
FIG. 1 is a block diagram of a single channel imaging laser radar system.

Referring to the drawings and especially to FIG. 1, a block diagram of a single channel image laser radar system 10 is illustrated which may be one channel of a plurality of channels in the present laser radar. A timing readout circuit 11 triggers the laser transmitter 12 which generates a laser pulse in the laser optics 13 which produces a laser beam 14 directed towards a target 15. The laser transmitter 12 simultaneously sends a start pulse to the range counter 16 to begin timing the time-of-flight of a laser pulse 14. The reflected laser pulse 17 is reflected from the target 15 and is received by the receiver optics 18. The receiver optics delivers a pulse to the photodetector 20 which converts the received laser pulse to a photo current which is sent to a pulse discrimination circuit 21. The pulse discrimination circuit detects the arrival of the received laser pulse and sends a stop pulse to the range counter 16 which computes the time-of-flight of the laser pulse 14. The timing and readout circuit 11 reads the time-of-flight data out of the range counter 16 and sends this information through a link 22 to a host computer.

Figure 2:
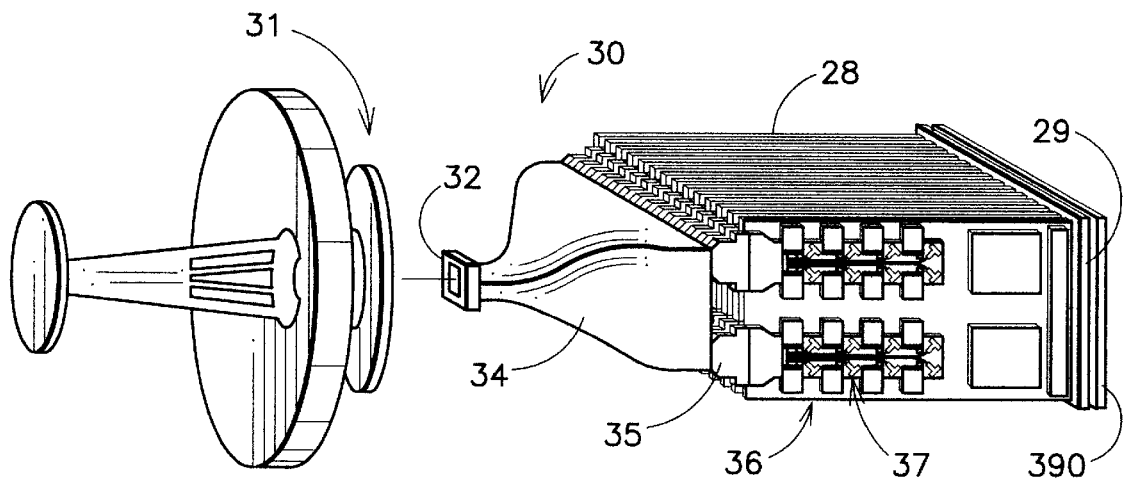
FIG. 2 is a perspective view of a parallel multichannel receiver in accordance with the present invention.
Figure 3:
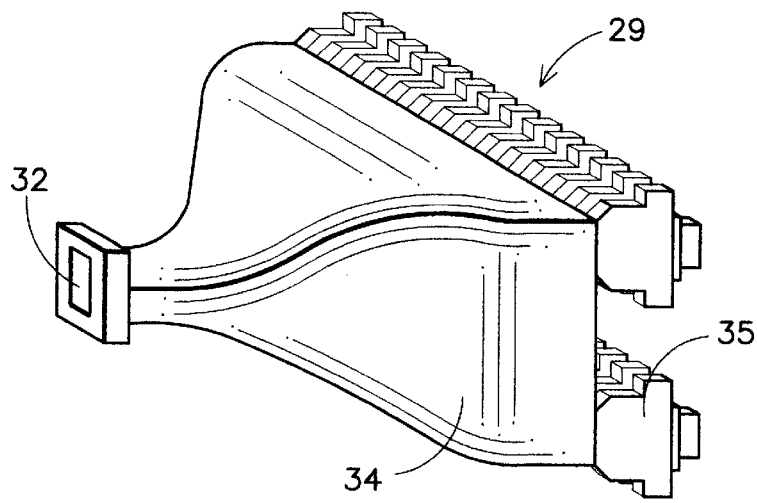
FIG. 3 is a perspective view of the focal plane interface assembly of FIG. 2.
Figure 4:
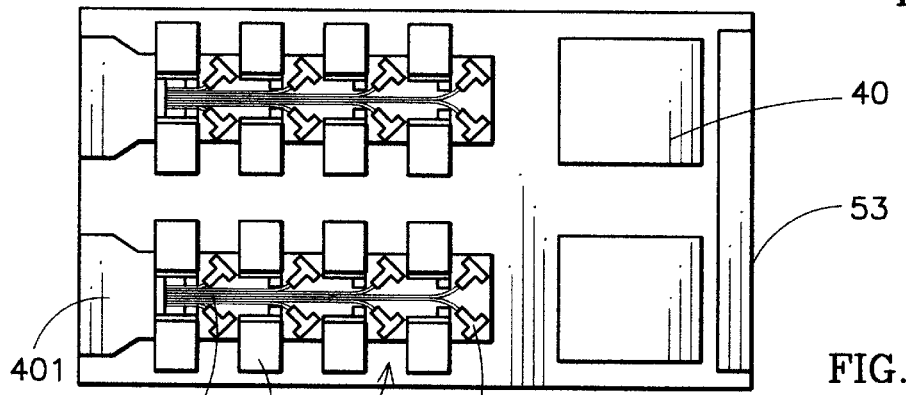
FIG. 4 is a perspective view of a multichannel optical receiver photonic hybrid card of FIGS. 1 and 2.

Turning to FIGS. 2, 3 and 4, a parallel multichannel receiver 30 has the receiver collecting optics 31 for receiving the reflected signals from an array of laser transmitters of FIG. 1 and which directs the array of laser beams onto a focal plane interface image dissector fiber optic alignment block 32 which connects a plurality of fiber optic ribbon cables 34 for directing the received signals into the fiber optics. The fiber optic cables 34 are in turn directed into the multichannel optical receiver photonic hybrid (or MORPH) connector 35 which has a plurality of individual optical fibers 42 attached thereto for routing the optical signals. Each MORPH board 36 may contain a pair of detector assemblies 37. Each detector assembly has a plurality of identical detectors 39. Each board 36 also includes a pulse discriminator circuit 38 for each detector 39. Each pulse discriminator circuit 38 is connected to the timing and circuit 40.

Referring to FIG. 4, the MORPH, as illustrated in FIG. 4, includes a detector array assembly 37, an array of hybrid pulse discrimination circuits 38, and multichannel range counters 40. The multilayer MORPH circuit card includes separate analog and digital power and ground planes, as well as microstrip construction and controlled impedance traces for the high speed timing signals. Optical signals from the receiver focal plane enter the MORPH via multichannel fiber optic connectors 401 on the edge of the MORPH. Time-of-flight data for each channel is provided by the MORPH on the electrical output connector 53 on the side opposite the optical input connector.

Figure 5:
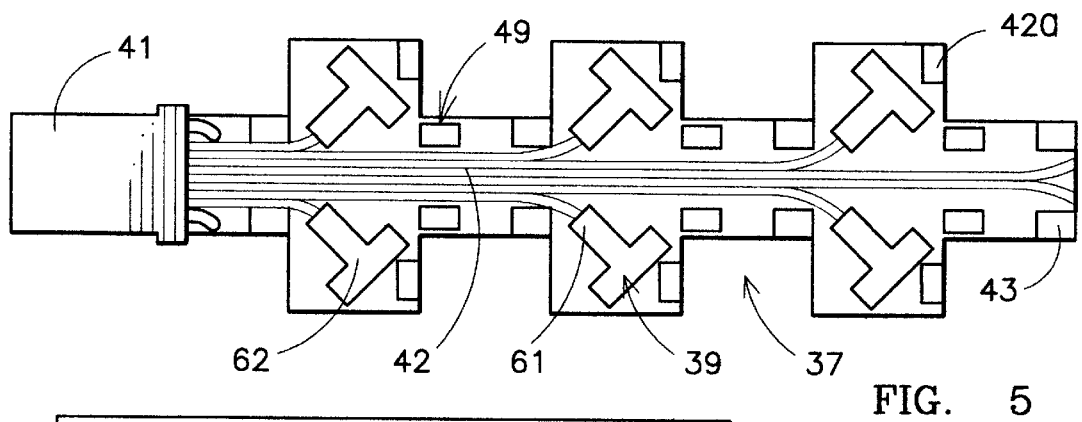
FIG. 5 is an elevation view of a detector assembly.
Figure 7:
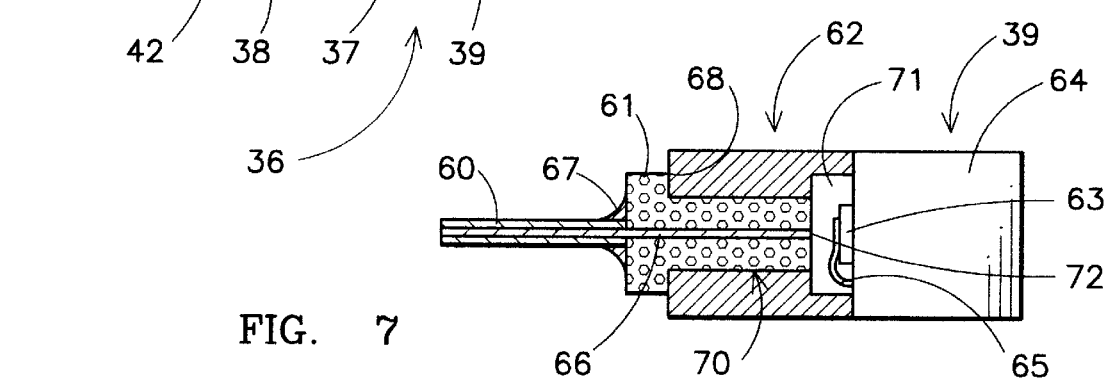
FIG. 7 is a sectional view taken through one detector assembly.

Referring to FIGS. 5 and 7, the detector assembly 37 includes a multichannel fiber optic input connector 41, fiber optic waveguide distribution system 42, InGaAs APD detectors 39 and APD biasing circuitry 49, mounted on a multilayer circuit card 43. The fiber optic waveguide distribution system 42 utilizes 100/125 micron core/clad optical fibers. The optical waveguides are terminated into a custom ceramic ferrule 61, which facilitates alignment with the detector 63. The ferrule mates with a ceramic microcage 62, which is preassembled on the 2 mm×2 mm×4 mm ceramic detector carrier 64. The microcage and ceramic ferrule arrangement assures that the 100 micron optical fiber core is centered with the 200 micron diameter InGaAs APD detector 63. In addition, the ferrule/microcage 62 holds the optical waveguide at the proper standoff distance from the detector 63. Each fiber 60 must be held at a distance such that it does not touch the bond wire 65 attached to the face of the detector 63, but close enough to assure that no overspill occurs from the light cone from the fiber 72, which has a numerical aperture of 0.22. The APDs are certified by the manufacturer to have a specific gain when operated at a reverse bias voltage which is different for each individual detector. Thus, a resistor divider with decoupling capacitor 49 is used to trim the bias voltage for each detector, according to the optimum bias voltage on the data sheet provided by the detector manufacturer with each detector.

Figure 6:
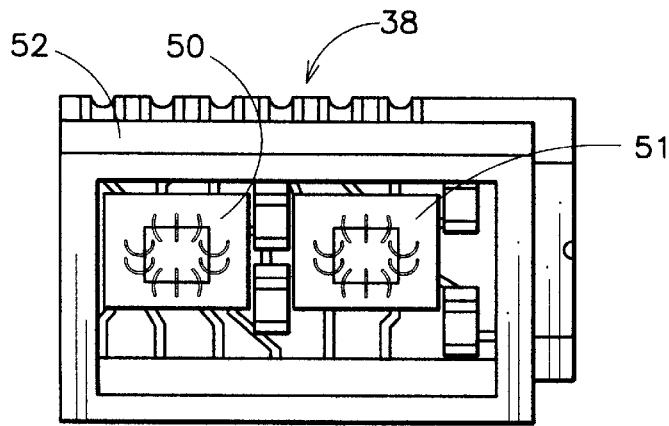
FIG. 6 is an elevation view of a pulse discrimination hybrid.

FIG. 6 shows the pulse discrimination hybrid 38 which includes a low noise (1.2 pA/Hz $^{1/2}$) transimpedance amplifier 51 and an ultra-high speed ECL threshold comparator 50, packaged in a custom ceramic hybrid package 52. The transimpedance amplifier converts the photocurrent generated by the detector into a voltage, and the threshold comparator generates a differential ECL-level STOP pulse when the transimpedance amplifier output exceeds a preset threshold voltage. The differential ECL STOP pulse is transmitted to the range counter via balanced microstrip transmission lines on the back side of the MORPH circuit card. The prototype hybrids use a transimpedance amplifier with 150 MHz bandwidth and transimpedance of approximately 10K ohms. The multichannel range counters 40 are CMOS time-to-digital converters (TDCs). Each TDC provides 8 time-of-flight registers for each of the eight channels on the detector assembly 37. Thus, each of the 8 channels can record up to 8 hits for each ranging event. Two range counters 40 are used on the prototype 16-channel MORPH 36. The time-of-flight data is output as sixteen bit words, with 500 ps least significant bit. Thus, the downrange resolution is 3 inches, with a maximum range of over 5 km. The master clock on the DCC 28 may be adjusted to give, for example, 6 inch downrange resolution, with the corresponding maximum range approximately 10 km.

The digital control card (DCC) 28 provides configuration and control, as well as a master clock, to all of the range counters, and it passes the digital range information from the MORPHs to the outside world via a parallel communication link. The digital control card 28 includes a programmable ECL clock, and a field-programmable gate array (FPGA). Each morph 36 connector 53 plugs into a slot in the passive backplane 29 thereof. On the ICP 390, the optical start pulse circuit includes an ST-style fiber optic input connector which has an integral InGaAs PIN diode. The PIN diode photocurrent is input to a pulse discrimination hybrid operated with a relatively high threshold voltage. The hybrid outputs a differential ECL START pulse which is transmitted to the MORPHS, via the passive backplane 29, whenever the ICP (Interface/Connector Panel) 390 receives an optical start pulse from the transmit laser. The DCC 28 includes a phase-locked, crystal-controlled, programmable ECL clock, which is adjustable on-the-fly. The clock speed determines the time represented by the least significant bit (LSB) of the multichannel range counter. For example, for a 250 MHz master clock, the LSB is 500 ps, resulting in 3 inches downrange resolution and 5 km maximum range. Similarly, for a 125 MHz clock, the LSB is 1 ns, and the downrange resolution is 6 inches, with 10 km maximum range. The master ECL clock is distributed from the DCC to balanced microstrip transmission lines which are terminated on the passive backplane. The clock is buffered at the transmission lines which are terminated on the passive backplane and then sent to the two range counters on each MORPH. Total clock skew between any two range counters is less than 50 ps. The microprocessor and Field Programmable Gate Array (FPGA) are used to synchronize, readout and readout the multichannel range counters. When a START pulse is received, the START pulse logic notifies the FPGA. The FPGA then enables the multichannel range counters to accept the STOP pulses from the pulse discrimination hybrids. When the ranging event is complete, the microprocessor controls the range counter's tristate data bus to sequentially read out the contents of each range counter, 24 bits at a time. The FPGA then transmits the range data to the outside world over a standard 24-bit parallel interface. Each MORPH 36 and a single digital control/readout circuit card (DCC) 28 are plugged into the passive back plane 29.

Referring now to FIG. 7, a sectional view of one detector 37 has one multimode optical fiber 60 connected thereto through a ceramic ferrule 61 extending into a ceramic microcage 62. A detector 63, such as a InGaAs APD detector is mounted to a ceramic detector carrier 64 and is electrically connected with a gold bond wire 65. Each multimode optical fiber 60 is passed through a bore 66 in the ceramic ferrule 61 and is attached with epoxy 67. The ceramic ferrule 61 has ledges 68 which allow it to slide into the bore 70 of the ceramic microcage 62 to a point leaving a space 71 in front of the detector 63. Thus, the optical fiber 60 can be attached to the ceramic ferrule 61 with the epoxy 67 in a preassembly and then attached into the ceramic microcage 62. This arrangement assures that the optical fiber core is centered with the detector 63 and in addition holds the optical waveguide at the proper standoff distance from the detector. Each fiber 60 end 72 is held at a distance such that it does not touch the bond wire 65 attached to the face of the detector 63 and close enough to assure that no overspill occurs from the light cone from the fiber.

It should be clear at this time that a multichannel laser radar has been provided which has a laser array transmitter for transmitting an array of laser beams along with a laser radar receiver for receiving the reflected array of laser beams processing through a parallel multichannel laser radar receiver having a plurality of multichannel optical receiver photonic hybrid circuits coupled thereto for processing received signal range information and forming an image therefrom. However, the present invention should not be considered limited to the forms shown which are to be considered illustrative rather than restrictive.

I claim:

1. A multichannel laser radar comprising:
    a laser array transmitter or flood illumination or knife edge for generating a multiple laser beam array; and
    a multichannel laser radar receiver for receiving reflected multiple laser beam array signals transmitted by said laser array transmitter, said multichannel laser radar receiver having a plurality of optical fibers coupled to a plurality of multichannel optical receiver photonic hybrid circuit boards for receiving said reflected signals and processing said received signal range information and forming an image therefrom; each said circuit board having at least one detector assembly mounted thereon, each detector assembly having a plurality of photodetectors mounted to receive one end of each said optical fiber, whereby a multichannel laser radar generates, and receives multiple laser beams and parallel processes the received multiple laser beams to generate an image therefrom.

2. A multichannel laser radar in accordance with claim 1 in which each said detector assembly has a plurality of optical detectors mounted on a circuit board, which circuit board is mounted to one multichannel optical receiver photonic hybrid circuit board.

3. A multichannel laser radar in accordance with claim 2 in which each said detector assembly has a plurality of detectors mounted thereto and each said detector is mounted in a microcage having an opening therein for mounting the end of one said fiber optic line.

4. A multichannel laser radar in accordance with claim 3 in which each said fiber optic line has a ceramic ferrule mounted on the end thereof shaped to fit into an opening in said detector microcage.

5. A multichannel laser radar in accordance with claim 4 in which each said fiber optic end is attached to said ferrule with an epoxy cement.

6. A multichannel laser radar in accordance with claim 1 in which each said ferrule has a flanged edge to position each said ferrule in said microcage to thereby position said fiber optic end in a predetermined position relative to said detector.

7. A multichannel laser radar in accordance with claim 6 in which said detector microcage is a ceramic microcage.

8. A multichannel laser radar in accordance with claim 7 in which each said detector assembly has a plurality of optical detectors mounted in microcages, each microcage being mounted at an angle to receive one said fiber optic line end mounted in a mounting ferrule.

9. A multichannel laser radar in accordance with claim 8 in which said detector assembly microcages are mounted to either side of a plurality of center fiber optic lines each terminating to one side in one microcage.

* * * * *